(12) United States Patent
Ploeger

(10) Patent No.: US 6,213,140 B1
(45) Date of Patent: Apr. 10, 2001

(54) HOSE CLAMP TOOL AND METHOD FOR CLAMPING HOSES OF MULTIPLE SIZE

(75) Inventor: Randall J. Ploeger, Clarinda, IA (US)

(73) Assignee: The Lisle Corporation, Clarinda, IA (US)

( * ) Notice: Subject to any disclaimer, the term of this patent is extended or adjusted under 35 U.S.C. 154(b) by 0 days.

(21) Appl. No.: 09/477,933

(22) Filed: Jan. 5, 2000

(51) Int. Cl.[7] ........................................ F16K 7/04
(52) U.S. Cl. ................... 137/1; 251/9; 81/318; 81/422
(58) Field of Search ................... 251/9; 81/422, 81/424, 318, 319, 324, 329, 416, 441

(56) References Cited

U.S. PATENT DOCUMENTS 5,152,497 * 10/1992 Bissell ........................................ 251/9

OTHER PUBLICATIONS

*Automotive Engineering*, Feb. 1993, p. 132.
*Automotive Engineering*, Apr. 1993, p. 52.
*765 OTC Catalog A–95*, Jan. 1995, p. 89, No. 5.
*OTC Catalog Supplement A9613*, p. 3, No. 7877.
*Hazet Specialty Tools Catalog 957*, No. 798.
*K.D. Tools Catalog 89007–01*, Mar. 1992, p. 61, No. 3252.
*Snap–On Catalog*, p. E63, No. HCP10.
*Snap–On Catalog*, p. E63, No. HCP20.
*Cal–Van Tools Catalog 9500*, p. 42, No. 452.
*Snap–On Catalog No. 500*, p. E23, pre–1999, part Nos. YA2850, TA965, HCP6 and HCP7.

* cited by examiner

Primary Examiner—Kevin Lee
(74) Attorney, Agent, or Firm—Banner & Witcoff, Ltd.

(57) ABSTRACT

The hose clamp tool has the form of a pliers with jaws extending from the plane of the handles at an angle of about 135 degrees. The jaws are defined by converging pincer surfaces to enable the clamp to be utilized with a wide range of hose sizes.

7 Claims, 4 Drawing Sheets

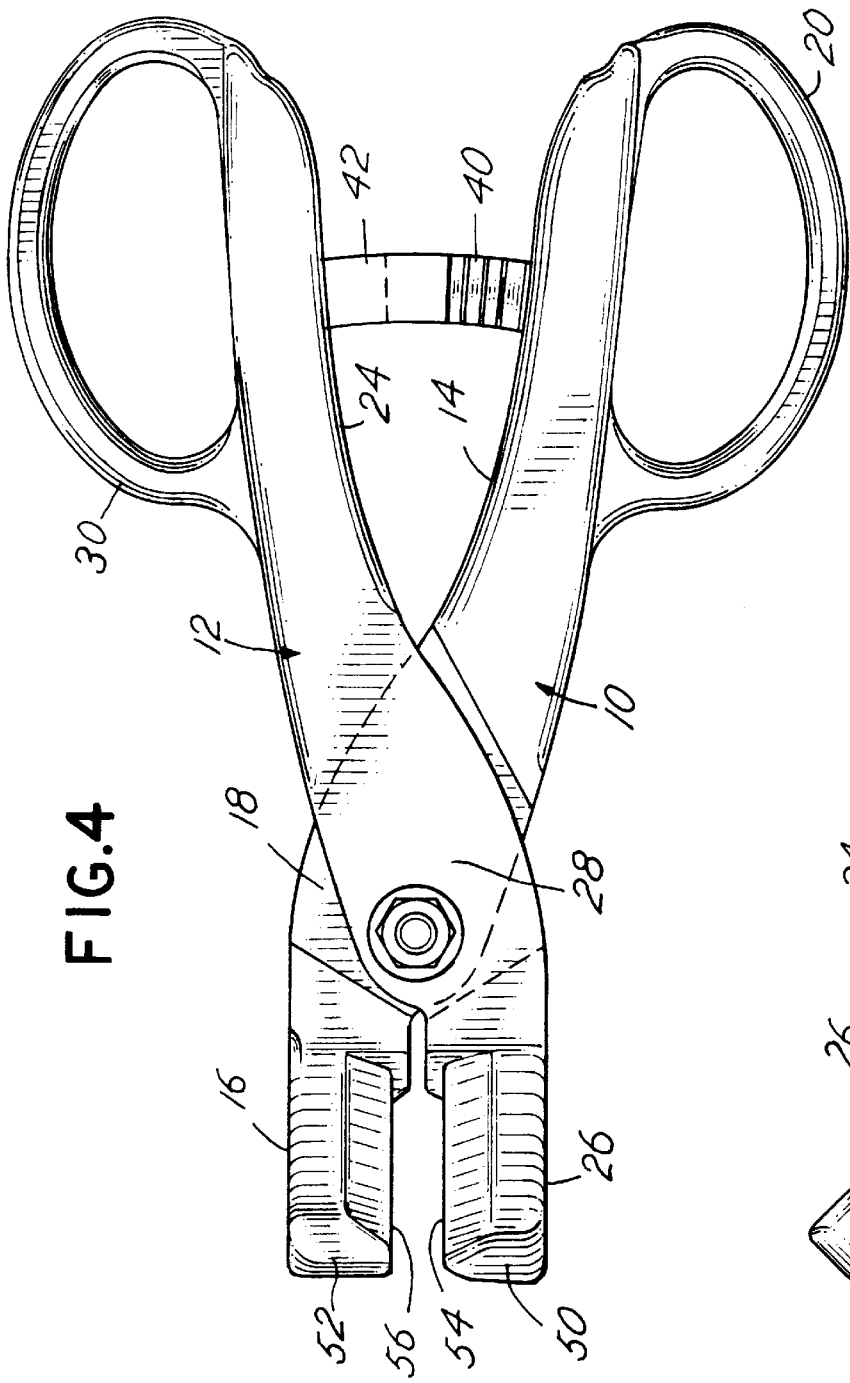
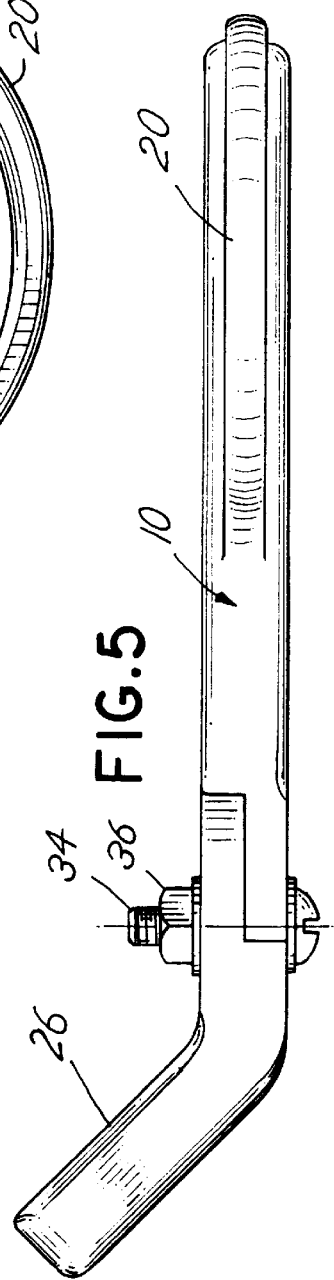

HOSE CLAMP TOOL AND METHOD FOR CLAMPING HOSES OF MULTIPLE SIZE

BACKGROUND OF THE INVENTION

This invention relates to a hose clamp tool and, more particularly, to a hose clamp tool capable of pinching a wide variety of hoses to close or seal the passage through the lease.

In the automobile repair business and the vehicle repair business, it is often necessary to clamp hoses, for example, radiator hoses, waterline hoses, brake line hoses and other hoses that are flexible and filled with fluid. Heretofore, hose clamp tools have been used in the vehicle repair field having the form of a simple pliers. The jaws of the pliers tool are closed and then a ring is placed around the handles of the pliers tool to hold the jaws in the closed position. Multiple sizes of such pliers tools are required in order to accommodate closure of various sizes of hoses. Also, two hands are required to effect the use of such a tool. One hand is used to close the jaws of the hose clamp tool by manipulation of the handles while a second hand is required to manipulate the ring which retains the handles in a locked position. As a consequence, there has developed a need for a hose clamp tool which is capable of utilization on a wide range and variety of hose sizes and types which is also operable with one hand.

SUMMARY OF THE INVENTION

In a principal aspect, the present invention comprises a hose clamp tool in the form of a pliers wherein the manually operated handles include overlapping handle retention members positioned between the handles. The handle retention members include interlocking teeth which are aligned along radii extending from the pivot axis of the tool. The clamping end of the tool includes pincers or jaws which project at an obtuse angle from the plane defined by the handles at an angle in a range from about 120 to 150 degrees. When the tool handles are fully closed, the pincers converge from the pivot point toward one another at a slight angle in order to enable the tool to accommodate and be effective for closing hoses having a wide range of diameters and the thicknesses.

Thus, it is an object of the invention to provide an improved hose clamp tool capable of closing hoses having a wide range of diameters.

It is a further object of the invention to provide a hose clamp tool which may be manually manipulated by one hand and which includes a locking feature to maintain the hose clamp in a closed, locked condition.

It is a further object of the invention to provide an improved hose clamp tool having manually operable handles that may be locked together in a closed position and may be manually released using a single hand.

Yet another object of the invention is to provide an improved hose clamp tool which is, economical to manufacture, easy to use and which is resistant to degradation due to exposure to corrosive fluids and environments.

These and other objects, advantages and features of the invention will be set forth in the detailed description which follows.

BRIEF DESCRIPTION OF THE DRAWINGS

In the detailed description which follows, reference will be made to the drawing comprised of the following figures:

FIG. 4 is a plan view of the hose clamp tool of the invention;

FIG. 5 is a side elevation of the hose clamp tool of FIG. 4;

DESCRIPTION OF THE PREFERRED EMBODIMENT

Figure 1:
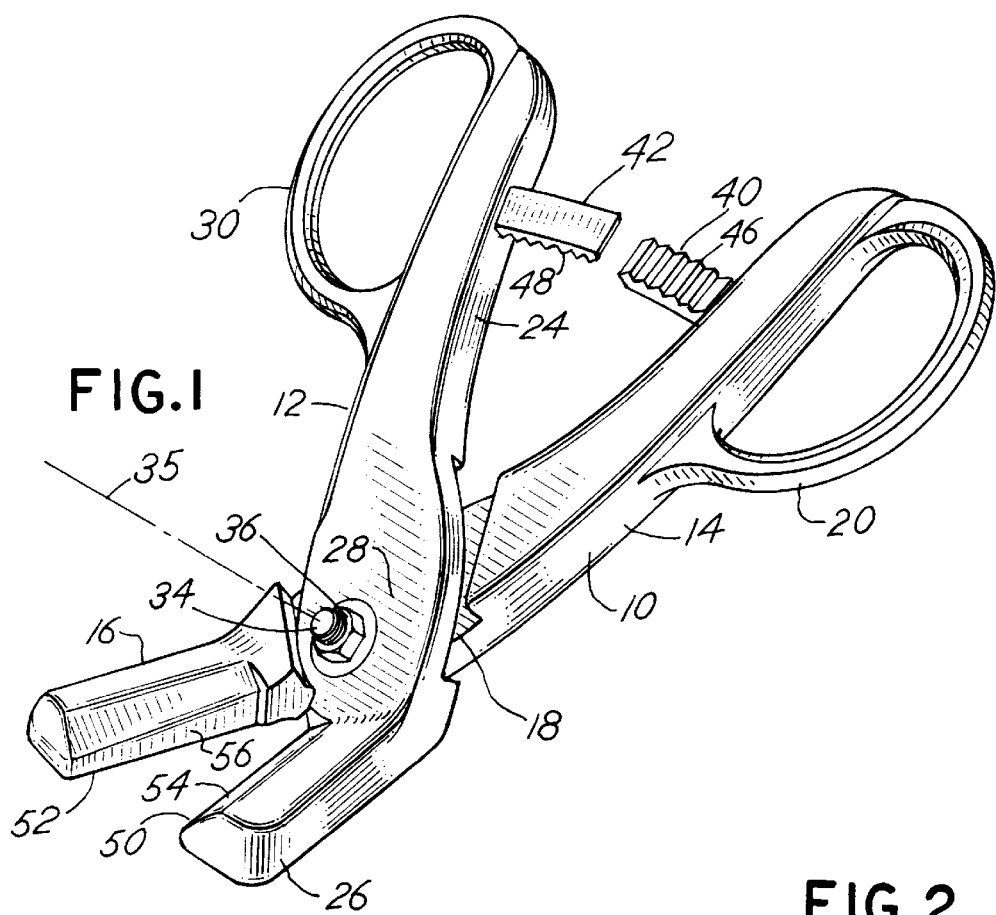
FIG. 1 is an isometric view of the hose clamp tool of the invention.
Figure 2:
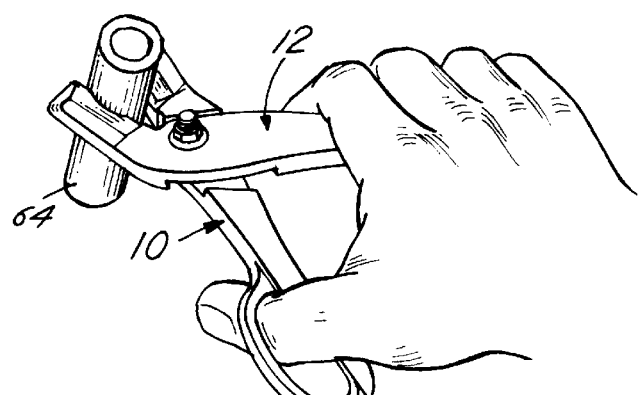
FIG. 2 is an isometric view illustrating the manner of use of the hose clamp tool of FIG. 1.
Figure 3:
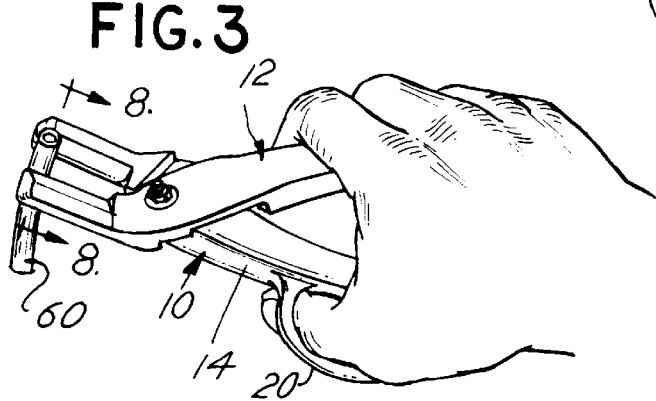
FIG. 3 is an isometric view illustrating the manner of use of the hose clamp tool of the invention with a small diameter hose or tube.
Figure 6:
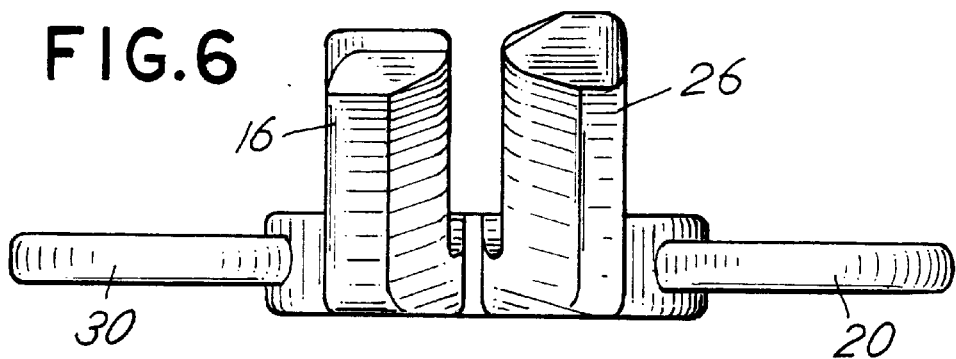
FIG. 6 is an end view of the clamp tool of FIG. 4.
Figure 7:
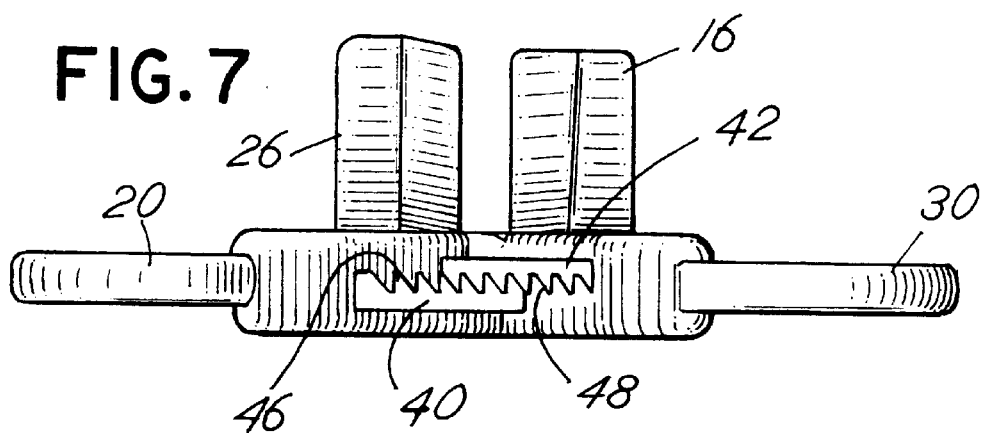
FIG. 7 is an end view of the handles of the hose clamp tool of FIG. 4.
Figure 8:
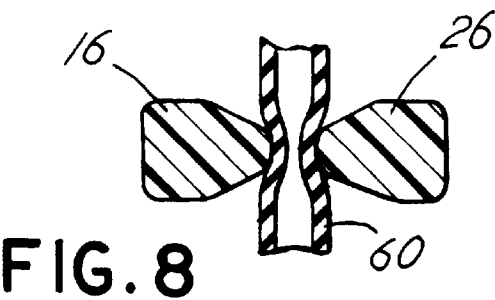
FIG. 8 is a cross-sectional view of the hose clamp of FIG. 3 taken along the line 8—8.

Referring to FIG. 1, the hose clamp tool includes a first handle 10 and a second handle 12. Handle 10 includes a manual grip end 14 and a hose clamp end or jaw 16 with an intermediate pivot section 18. The grip end 14 includes a molded loop 20 so that the user may insert a thumb or another digit through the loop 20. Loop 20, also shown in FIGS. 2 and 3, is adapted to receive the thumb of a mechanic or operator.

Figure 9:
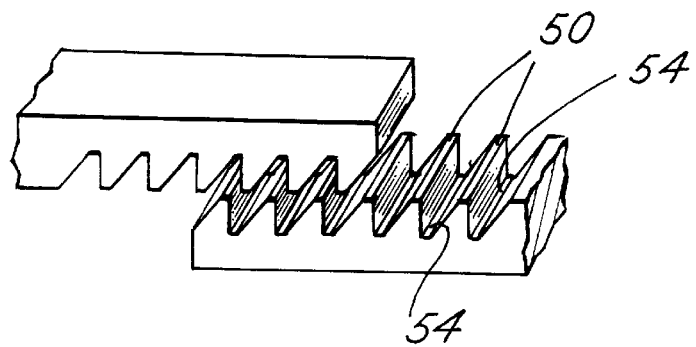
FIG. 9 is an enlarged isometric detail view of the serrations or teeth associated with the retention members for the handles of the tool.

The second handle 12 includes a manual grip end 24 and a hose clamp end or jaw 26 with an intermediate pivot section 28. A finger loop 30 is affixed to the grip end 24 for receipt of a digit or fingers of an operator. The pivot sections 18, 28 of the respective handles 10, 12 are connected by means of a bolt and nut 34 and 36 defining a pivot axis 35. Each handle 10, 12 further includes a molded inwardly extending retention member 40 and 42, respectively. Each retention member 40, 42 comprises an integrated molded tab extension of a handle 10,12 each extension including opposed serrations or teeth 46 and 48, respectively. The teeth 46, 48 include crests 50 and valleys 54. Each of the crests 50 and valleys 54 coincide or lie on a radius extending from the pivot axis 35. In this manner, as the retention members 40, 42 are brought together, the teeth 46, 48 will properly align and fully mesh to provide the most effective gripping action to hold the handles 10, 12 in a fixed position relative to one another. Preferably, the teeth or serrations 46,48 are slightly skewed in cross section as shown in FIG. 9 to thereby enhance the interlocking action when the retention members 40, 42 overlap one another and the handles 10, 12 are moved toward one another. The retention members 40, 42 are curved or arcuate and lie on a circle having the axis 35 as a center point. Also, the rotation members 40, 42 have an increasing thickness adjacent the handle 10, 12 to which they are attached.

The hose clamp end 16, 26 of each handle 10, 12 is comprised of an elongated pincer blade 50, 52 respectively projecting at an angle from the plane defined by the handles 10, 12. The pincer blades 50, 52 each project at an angle of approximately 135 degrees from the plane defined by the grip ends of the handles 10, 12. Other angles of inclination are possible with a preferred range of 120 to 150 degrees.

The pincer blades 50, 52 define opposed, flat, planar hose gripping surfaces 54, 56 which are typically spaced from one another in relation to the position of the handles 10, 12. The opposed gripping surfaces 54, 56 may be serrated or knurled, but in a preferred embodiment, they into are planar and flat.

Figure 10:
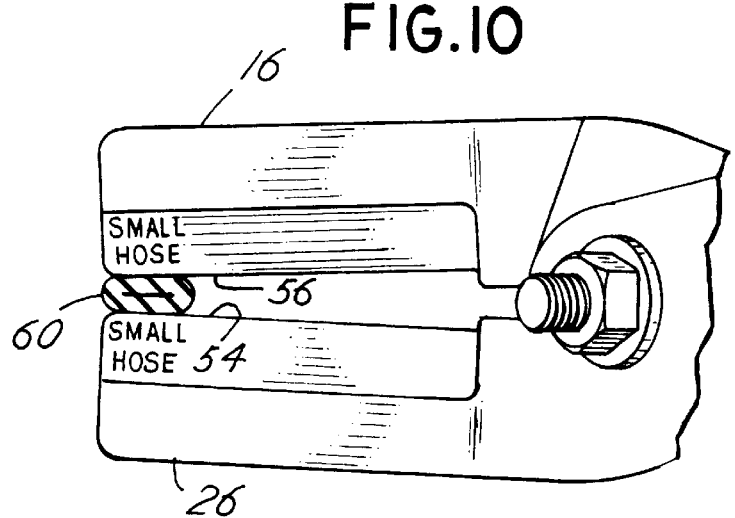
FIG. 10 is a plan view of the pincers of the tool positioned to close a small diameter hose.

The gripping surfaces 54, 56 converge together toward the distal ends of the blades 50, 52 when the handles 10, 12 are substantially, fully closed. When so closed, the angle of convergence is in the range of 4 to 10 degrees and preferably about 5 degrees. The purpose of the convergence is to enable the extreme distal end of the surfaces 54, 56 to be positioned more closely together than the portion of the surfaces 54, 56 adjacent the axis 35 when the handles 10, 12 and thus the jaws 16, 26 are substantially closed. As a result, a smaller diameter hose 60 may be placed between the jaws 16, 26 at the distal ends between surfaces 54, 56 as depicted in FIG. 10, and the hose 60 will then be substantially fully compressed to a closed position inasmuch as the spacing of the jaws 16, 26 at the distal end is less than adjacent the axis 35. Preferably, a legend is provided (not shown) on the ends of the blades 50, 52 indicating that small diameter hoses are to be gripped at the distal ends.

Figure 11:
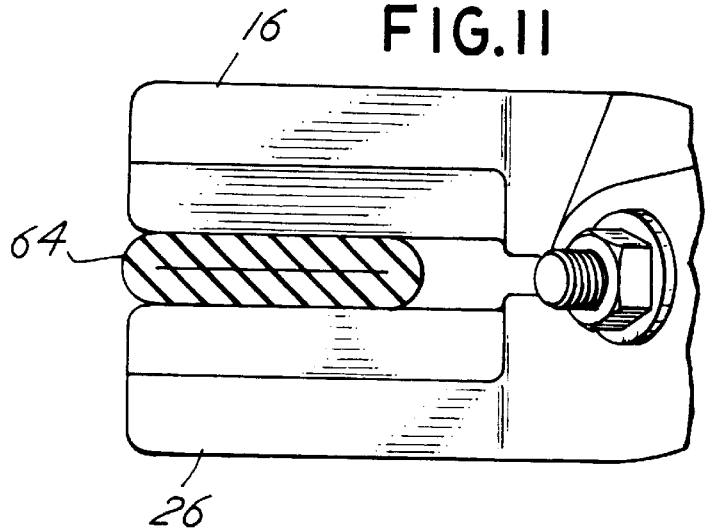
FIG. 11 is a plan view of the pincers of the tool positioned to close a larger diameter hose.

Larger diameter hoses may also be effectively closed as depicted in FIG. 11. There a hose 64 is compressed between jaws 16, 26 and is engaged along a significant portion of the opposed surfaces 54, 56. Because the hose 64 is larger and most likely thicker, the full area of the surfaces 54,56 may be brought to bear upon the hose 64. The jaws 16,26 are more completely spaced in this circumstance, and because they are not fully closed, the entire surfaces 54, 56 will actively engage the hose 64. As a result, a greater surface portion of the gripping surfaces 54,56 is utilized. Note, the handles 10, 12 are not fully closed in FIG. 11. Nonetheless, the gripping surfaces 54, 56 and the jaws will act to fully close the hose 64.

In review then, the convergence of the gripping surfaces toward one another toward the distal end of the blades enables the jaws 16,26 to accommodate hoses of very small diameter at the distal end, as well as hoses of larger diameter and thickness between the entirety of the jaws 16, 26 or gripping surfaces 54, 56 as illustrated in FIGS. 10 and 11, by way of example. The retention members 40, 42 previously described, render possible attachment of the hose clamp tool to hoses having a wide range of sizes and maintenance of the hose clamp in a closed position. In use, smaller diameter hoses (e.g., 60) are positioned at the distal end of gripping surfaces 54, 56 as shown in FIG. 10. Larger diameter hoses (e.g., 64) are engaged over a larger surface area of surfaces 54, 56 with less convergence of jaws 16, 26 as in FIG. 11. In each event, the tool is placed on the hose so that the outside surface of the hose is aligned substantially with the distal end of the surfaces 54, 56 of jaws 16,26 as depicted in FIGS. 10 and 11. Such alignmnent enables use of the tool for hoses having a wide range of diameters and thickness.

The handles 10, 12 are typically made of a glass filled nylon material to resist corrosion and degradation. Further, the handles 10, 12 are slightly flexible so that an operator such as a mechanic, may squeeze the handles 10, 12 together with one hand and slightly twist the handles 10, 12 so as to release the retention members 40, 42 when it is desired to release the tool from a hose. As a consequence, the hose clamp tool is operable manually with a single hand during both the closure and opening operations or modes.

With the hose clamp tool as set forth above, it is possible to clamp hoses having a wide range of diameters and thicknesses. This results because the pincer jaws 16, 26 have the converging surfaces 54, 56 described. The jaws 16,26 are at an angle relative to the grip ends 14,24 to facilitate access of the jaws 16, 26 to hoses located in restricted areas of access. The retention members 40, 42 enable manual operation by a single hand and positive retention of the handles 10, 12 in the closed position. It is possible to vary the construction of the retention members 40,42 and the jaws 16, 26 without departing from the true scope of the invention. Therefore, the invention is limited only by the following claims and equivalents thereof.

What is claimed is:

1. A hose clamp tool comprising, in combination:
    a first handle having a manual grip end and a hose clamp end with an intermediate pivot;
    a second handle having a manual grip end and a hose clamp end with an intermediate pivot, said first and second handles being connected at the intermediate pivot to rotate about a pivot axis by a connection mechanism to provide a scissors action upon movement of the grip ends to effect the movement of the hose clamp ends together as the grip ends are moved toward one another, each of said handles including a handle retention member projecting from each handle toward the other handle, each retention member including teeth and grooves for interlocking the retention members to maintain the handles in a fixed, spaced relationship;
    said retention members being releasable to allow repositioning of handle spacing, said retention member teeth and grooves defining crests and valleys respectively, said crests and valleys aligned with a radius extending from the pivot axis of the connected handles,
    said hose clamp end of each handle comprising a pincer blade projecting from the respective handle at an equal obtuse angle from the plane defined by the handles,
    said pincer blades opposed to each other to form a hose engaging clamp.

2. The tool of claim 1 wherein the obtuse angle is in the range of 120 to 150 degrees.

3. The tool of claim 1 wherein the obtuse angle is about 135 degrees.

4. The tool of claim 1 wherein the pincer blades include opposed hose gripping surfaces, each of said surfaces being planar, said surfaces converging together toward the distal end of the blades when the manual gripping ends are substantially closed and forming an angle of conveyance in the range of about 4 to 10 degrees.

5. The tool of claim 3 wherein the angle of conveyance is about 5 degrees.

6. A method for clamping hoses of multiple diameters with a single tool comprising the steps of:
    (a) manually grip a hose clamp tool of a type having a first handle with a manual gripping end and a hose clamp end with an intermediate pivot,
    a second handle having a manual grip end and a hose clamp end with an intermediate pivot; said first and second handles being connected at the intermediate pivot to rotate about a pivot axis by a connection mechanism to provide a scissors action upon movement of the gripping ends to effect movement of the hose clamp ends together as the grip ends are moved toward one another;
    each of said handles including a handle retention member projecting from each handle toward the other handle, each retention member including teeth and grooves for interlocking the retention members to maintain the handles in a fixed, spaced relationship;

said retention members being releasable to allow repositioning of the handle spacing;

said retention member teeth and grooves defining crests and valleys aligned with a radius from the pivot axis of the connected handles, said hose clamp end of each handle comprising a pincer blade projecting from the respective handle at an equal obtuse angle in the range of about 120 to 150 degrees from the plane defined by the handles, said pincer blades opposed to each other and each including a generally planar, hose gripping surface, said surfaces converging together when the manual grip ends are substantially closed, said angle of convergence in the range of about 4 to 10 degrees;

(b) positioning the hose clamp ends over a hose with the outer diameter of the hoses aligned substantially with the outermost distal end of the hose clamp end; and (c) closing the grip ends by manual pivoting about the axis and thereby closing the clamp ends to compress the hose to a closed condition and causing the retention members to engage and lock the tool in a hose compression position, whereby smaller diameter hoses are compressed by the distal end of the hose clamp ends by the convergence of the gripping surfaces and larger diameter hoses are compressed between a greater portion of the gripping surfaces at a lower amount of convergence.

7. A method for clamping hoses of multiple diameters with a single tool comprising the steps of:

(a) manually grip a hose clamp tool of a type having a first handle with a manual gripping end and a hose clamp end with an intermediate pivot, a second handle having a manual grip end and a hose clamp end with an intermediate pivot; said first and second handles being connected at the intermediate pivot to rotate about a pivot axis by a connection mechanism to provide a scissors action upon movement of the gripping ends to effect movement of the hose clamp ends together as the grip ends are moved toward one another;

each of said handles including a handle retention member projecting from each handle toward the other handle, each retention member including teeth and grooves for interlocking the retention members to maintain the handles in a fixed, spaced relationship;

said retention members being releasable to allow repositioning of the handle spacing;

said pincer blades opposed to each other and each including a generally planar, hose gripping surface, said surfaces converging together when the manual grip ends are substantially closed, said angle of convergence in the range of about 4 to 10 degrees;

(b) positioning the hose clamp ends over a hose with the outer diameter of the hoses aligned substantially with the outermost distal end of the hose clamp end; and (c) closing the grip ends by manual pivoting about the axis and thereby closing the clamp ends to compress the hose to a closed condition and causing the retention members to engage and lock the tool in a hose compression position, whereby smaller diameter hoses are compressed by the distal end of the hose clamp ends by the convergence of the gripping surfaces and larger diameter hoses are compressed between a greater portion of the gripping surfaces at a lower amount of convergence.

* * * * *